United States Patent [19]
Stokes

[11] Patent Number: 5,386,489
[45] Date of Patent: Jan. 31, 1995

[54] DEFORMABLE SHAPE-RETAINING FIBEROPTIC DEVICE

[75] Inventor: Albert J. Stokes, San Jose, Calif.

[73] Assignee: Christine E. Munson, San Jose, Calif.; a part interest

[21] Appl. No.: 157,729

[22] Filed: Nov. 24, 1993

Related U.S. Application Data

[63] Continuation-in-part of Ser. No. 663, Jan. 5, 1993, abandoned.

[51] Int. Cl.⁶ ............................. G02B 6/04; G02B 6/44
[52] U.S. Cl. ........................................ 385/100; 362/32; 264/154
[58] Field of Search ............ 385/100, 115, 901; 362/32, 33, 103, 104, 109, 251, 800; 264/154, 257, 286

[56] References Cited

U.S. PATENT DOCUMENTS

| | | | |
|---|---|---|---|
| 3,817,595 | 6/1974 | Edelman et al. | 350/96 B |
| 4,141,622 | 2/1979 | Beal | 350/96.23 |
| 4,153,332 | 5/1979 | Longoni | 350/96.23 |
| 4,420,220 | 12/1983 | Dean et al. | 350/96.23 |
| 4,852,964 | 8/1989 | Holland et al. | 350/96.23 |
| 4,966,741 | 10/1990 | Rush et al. | 264/154 |
| 5,086,378 | 2/1992 | Prince | 362/103 |
| 5,109,461 | 4/1992 | Churchill | 385/115 |

Primary Examiner—Akm E. Ullah
Attorney, Agent, or Firm—Schneck & McHugh

[57] ABSTRACT

A flexible shape-retaining light guide device for illuminating fixed objects from a remote fixed light source. The light guide combines a bundle of flexible optical fibers with a shape-retention member. The fiber bundle and shape-retention member are surrounded by a flexible jacket of heat shrink material. In one embodiment, the fibers are connected to the shape-retention member only at the output end of the light guide by an annular sleeve. The input end of the light guide is unfinished to accommodate movement of the guide's components relative to one another as the guide is positioned. Once positioned the input end of the light guide is cut to length and secured near the light source. In an alternate embodiment, a removable optically transparent end cap frictionally engages the outer surface of the jacket at each end of the device to retain the fibers and keep out contaminants. Once positioned, the device is cut to length and the new end is resealed with the removed end cap. The light guide can accommodate a variety of separation distances, relative positions and intervening environments between light source and illuminated object and is able to assume and retain a variety of convoluted shapes.

20 Claims, 3 Drawing Sheets

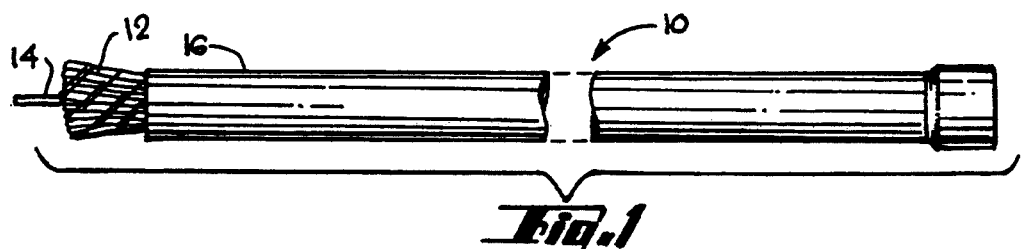
Fig.1
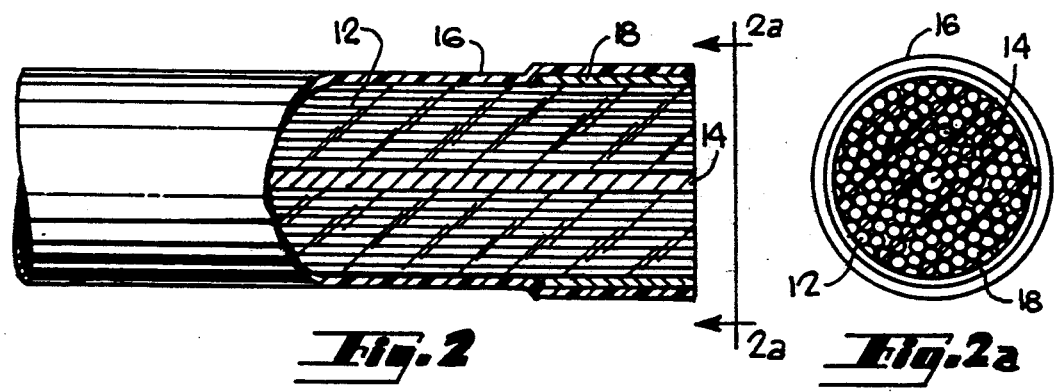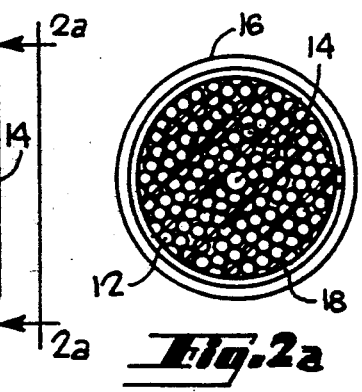
Fig.2  Fig.2a
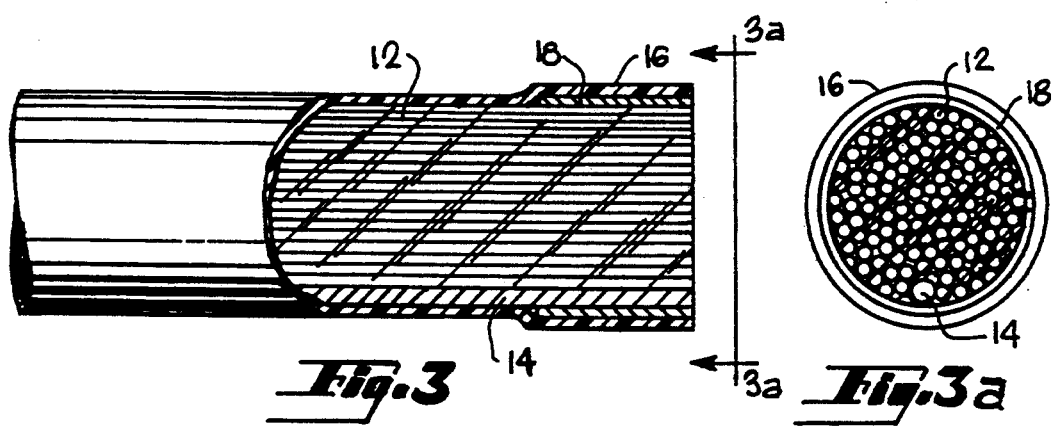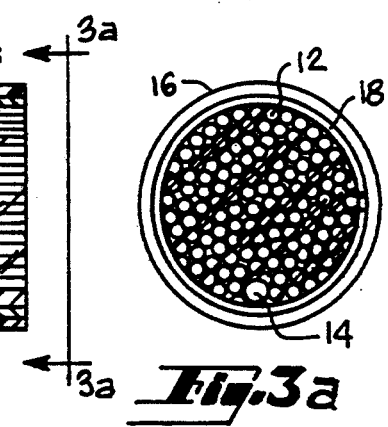
Fig.3  Fig.3a
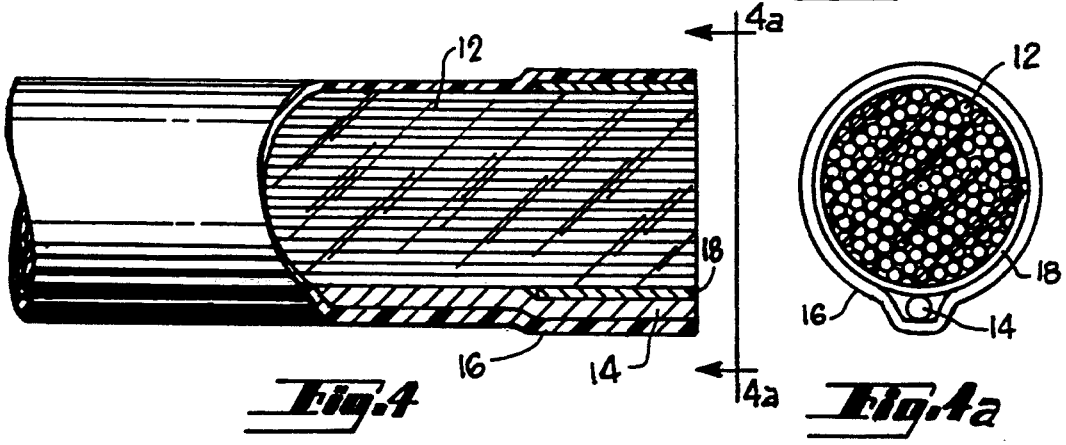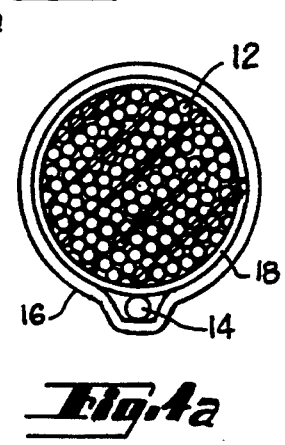
Fig.4  Fig.4a

DEFORMABLE SHAPE-RETAINING FIBEROPTIC DEVICE

CROSS-REFERENCE TO RELATED APPLICATION

This application is a continuation-in-part of U.S. patent application Ser. No. 08/000,663, filed Jan. 5, 1993, now abandoned.

TECHNICAL FIELD

This invention relates generally to fiberoptic devices used in illuminating systems, and in particular to an improved shape-retaining fiberoptic light guide for use in illuminating fixed objects from a remote fixed light source.

BACKGROUND ART

There are many environments in which it is not possible or convenient to position a fixed light source where it can illuminate a fixed object. This is particularly a problem with human powered vehicles such as bicycles where weight, cost, and wind resistance are major concerns. Bicycles frequently have accessory devices such as speedometers or computers attached to the handlebar where they can be safely observed by the rider. At night these devices cannot be used unless they are illuminated. A fiberoptic light guide positioned to receive light from the bicycle's headlight and illuminate an area near the handlebar would allow use of such devices at night without significantly increasing weight or wind resistance. The light guide must be flexible enough to operatively position its ends to receive light from the headlight and transmit it to the handlebar. The light guide must also be able to retain its shape after being so positioned. Conventional fiberoptic cables or devices are either too flexible or too stiff for this purpose and are not typically designed to retain a variable flexed shape.

Optical cables having elongated reinforcing members are well known. U.S. Pat. Nos. 4,141,622 to Beal and 4,153,332 to Longoni disclose optical cables having central reinforcing members made of steel wire. U.S. Pat. No. 4,141,622 to Beal also discloses a plurality of plastic elongate members interspersed with optical fibers of equal diameter to provide additional tensile reinforcement. U.S. Pat. No. 4,420,220 to Dean et al. discloses a pair of steel wire reinforcing members located on either side of the optical fibers. The purpose of these reinforcing members is to protect the optical fibers from tensile stress while maintaining flexibility. An optical cable is typically designed to be wound on drums or spools for storage and shape retention is not a desirable characteristic.

Optical cables which have been treated to maintain a fixed shape are also known. U.S. Pat. Nos. 3,817,595 to Edelman et al. and 4,852,964 to Holland et al. disclose helically coiled cables in which the optical fibers are contained within a jacket made of a material having a plastic memory. The cables are curled on a mandrel and then heat treated to set the shape of the sheath. These cables can accommodate a variety of separation distances between their ends but they are unable to retain a manually formed variable shape.

Optical devices for illuminating remote objects from a fixed light source are also known. U.S. Pat. No. 5,109,461 to Churchill discloses a fiberoptic light device for use in illuminating an object being examined with an optical comparator. The device has a hollow U-shaped housing with a pair of flexible segmented conduits containing optical fibers located on opposite sides of the U. Each conduit contains a separate bundle of fibers which are mechanically fixed to one another along their length by a UV-cured adhesive. The conduits extend inwardly from mounting collars on the outer surface of a metal cover plate and are adjustably positionable for illuminating the object. Shape retention is provided by the external conduit. U.S. Pat. No. 5,086,378 to Prince discloses a fiberoptic finger light for use with night vision devices in an aircraft cockpit. The light source is strapped to the wrist of the operator and connected to a pair of fiberoptic cables which are strapped to the operator's finger.

Incorporation of a deformable elongated member into a structure in order to provide shape retention is also known. U.S. Pat. No. 4,966,741 to Rush et al. discloses a shape retention hose construction where a deformable elongated member is located on the outer surface of a hose in a projecting channel.

Prior art optical fiber cables and devices are not designed to retain a variable flexed shape. Bending of an optical fiber cable into a convoluted shape necessitates longitudinal motion of the individual fibers relative to one another and to the cable jacket. Prior art devices in which the optical fibers are mechanically fixed to one another at both ends or along their length cannot be bent into convoluted shapes. Fixed light sources and objects to be illuminated are often located in variable positions relative to one another and a fiberoptic light guide must accommodate a variety of separation distances. Prior art devices which can accommodate a variety of separation distances are not designed to be manually deformed and retain a variable flexed shape.

It is therefore an object of the present invention to provide an improved fiberoptic light guide capable of retaining the shape to which it is manually formed.

It is a further object to provide an improved light guide which can be bent into convoluted shapes.

It is a further object to provide an improved light guide which can be adapted to accommodate a variety of separation distances, relative locations and intervening environments between light source and illuminated object.

SUMMARY OF THE INVENTION

The above objects have been met by an improved fiberoptic light guide which retains its shape when bent into a variable serpentine configuration. The light guide consists of a flexible elongated bundle of relatively small discrete clad fibers of conventional design. Individual fibers are independent from one another along their length to permit flexing of the bundle as a whole. An elongated shape-retention member is disposed adjacent to the fiber bundle along its length. The fiber bundle and shape-retention member are mechanically connected by an annular sleeve located at the output end of the guide where the fiber ends are coplanar. The entire assembly is surrounded by a flexible elongated jacket along its length.

The input end of the guide is unfinished so that the guide may be manually bent starting from the output end into any desired configuration prior to cutting the guide to the appropriate length. The input and output ends will thus have coplanar fiber ends even though the lengths of the individual fibers may vary. The jacket, fibers and shape retaining-member are all slidable with respect to one another.

Alternatively, the ends of the guide are sealed by optically transparent end caps. The end caps are removable and frictionally engage the outer surface of the jacket to retain the fibers and seal out contaminants. After manually forming the guide to accommodate the available path between a fixed light source and a remote object, any excess length is cut from the guide ends and the end caps are transferred to the new ends.

In operation the light guide is attached at a point near the light source and at a point near the illuminated object by conventional means. The output end is then positioned by manual bending to illuminate the object and the input end is positioned by manual bending to receive light from the light source and cut to length. In one version employing an annular sleeve, a transparent end cap is attached to the coplanar input end to retain the fibers and protect against contaminants, if desirable. In a second version where both ends are sealed with transparent end caps, both ends may be cut to an accommodating length and thus made coplanar. The resulting relative positions of the input and output ends are maintained by the guide's shape retention member.

An advantage of the light guide of the present invention is that it will retain the shape to which it is manually formed.

Another advantage is that the light guide can be bent into convoluted shapes.

A further advantage is that the light guide can be adapted to accommodate a variety of separation distances, relative locations and intervening environments between light source and illuminated object.

BRIEF DESCRIPTION OF THE DRAWINGS

FIG. 1 is an elevational view, shown partly in section, of one embodiment of the present light guide.

FIG. 2 is a sectional view of the output end of one embodiment of the light guide in which the shape retention member is centrally located within the fiber bundle.

FIG. 2A is a cross-sectional view along line 2a of FIG. 2.

FIG. 3 is a sectional view of the output end of a second embodiment of the light guide in which the shape retention member is located peripherally within the fiberoptic bundle.

FIG. 3A is a cross-sectional view along line 3a of FIG. 3.

FIG. 4 is a sectional view of the output end of a third embodiment of the light guide in which the shape retention member is located between the sleeve and jacket.

FIG. 4A is a cross-sectional view along line 4a of FIG. 4.

BEST MODE FOR CARRYING OUT THE INVENTION

Figure 5:
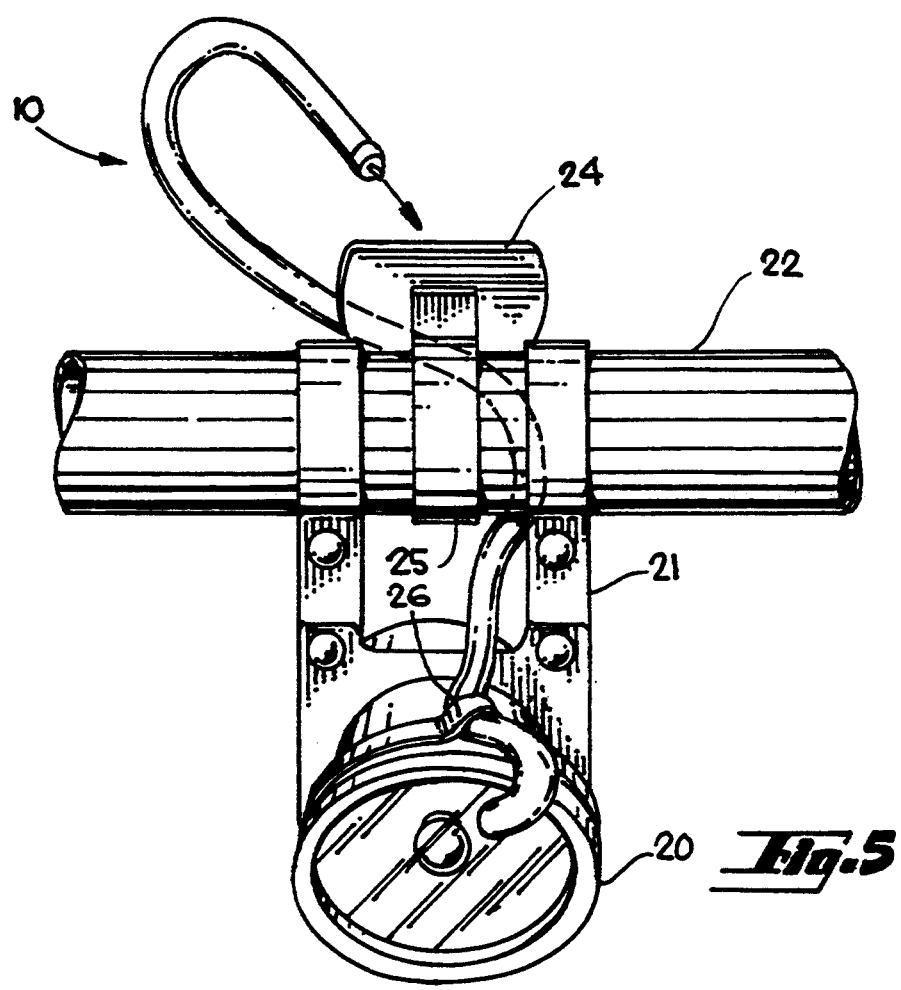
FIG. 5 is a front perspective view of the light guide mounted between a bicycle headlamp and a handlebar mounted speedometer.

With reference to FIG. 1, a flexible elongated light guide 10 of the present invention is shown in straight fashion. Light guide 10 comprises a bundle of individual optical fibers 12 and a reformable elongated shape-retention member 14 surrounded by a flexible jacket 16. Optical fibers 12 are of conventional design having a transparent core of a high refractive index covered with a thin layer of transparent cladding material of a low refractive index. In a preferred embodiment, optical fibers 12 are manufactured of polymethyl methacrylate available from Mitsubishi Rayon Company under the trade-name ESKA TM and have a diameter of 0.010 inch. Shape-retention member 14 is an elongated wire of ductile metal such as copper with a diameter sufficient to maintain the shape to which it and light guide 10 are manually formed. Shape-retention member 14 is not designed to significantly increase the tensile strength of light guide 10. Materials which can be stretched considerably beyond their elastic limits, such as copper, are therefore preferred. Such materials deform beyond these limits. Any reformable material which retains the shape to which it is manually formed, however, may be substituted. Shape-retention members having non-circular cross-sections, such as rectangular bars, may also be used, although circular cross-sections are preferred to allow the fibers and shape-retention member to slide freely with respect to one another in both the radial and axial directions as the guide is bent. Sixteen gauge copper wire having a diameter of 0.051 inch is used in a preferred embodiment. The diameter of shape-retention member 14 should be of sufficient diameter to retain the light guide in a serpentine shape when flexed and may increase in diameter as the number of optical fibers and/or jacket stiffness increases. Jacket 16 is a tube of flexible material such as plastic and in a preferred embodiment is a plastic shrink tube whose diameter decreases from three-eighths of an inch to three-sixteenths inch when heated at 120° C. for a brief time.

Referring now to FIGS. 2–4, which show the output ends of several preferred embodiments, an annular sleeve 18 surrounds fibers 12 and shape-retention member 14 in order to mechanically secure fibers 12 and shape-retention member 14 such that the ends of fibers 12 are maintained in a coplanar arrangement. In the preferred embodiment sleeve 18 is a ferrule of conventional design and the output ends of fibers 12 and shape-retention member 14 are dipped in an adhesive such as epoxy prior to attachment of sleeve 18. Shape-retention member 14 may be centrally located as shown in FIG. 2 and 2A or peripherally located as seen in FIG. 3 and 3A. Shape-retention member 14 may also be located exterior to sleeve 18 as seen in FIG. 4 and 4A. In the embodiments in which shape-retention member 14 is peripherally located it may be welded or soldered or adhered by adhesive means to the interior or exterior surface of sleeve 18. The shape of sleeve 18 may also be varied to provide a variety of output beam shapes. Fibers 12 and shape-retention member 14 are only secured at the output end of light guide 10 by sleeve 18 so that they may slide freely relative to one another in order to accommodate manual bending of light guide 10 into serpentine shapes.

Referring now to FIG. 5, light guide 10 is shown attached to a bicycle headlight 20 which is secured by a mounting bracket 21 to a bicycle handlebar 22. The output end of light guide 10 is shown in its flexed shape retaining position in order to illuminate a cyclometer 24 which is attached to handlebar 22 by a mounting bracket 25. Light guide 10 is secured near its input end to headlight 20 by a cable-tie mounting strap 26.

Figure 6:
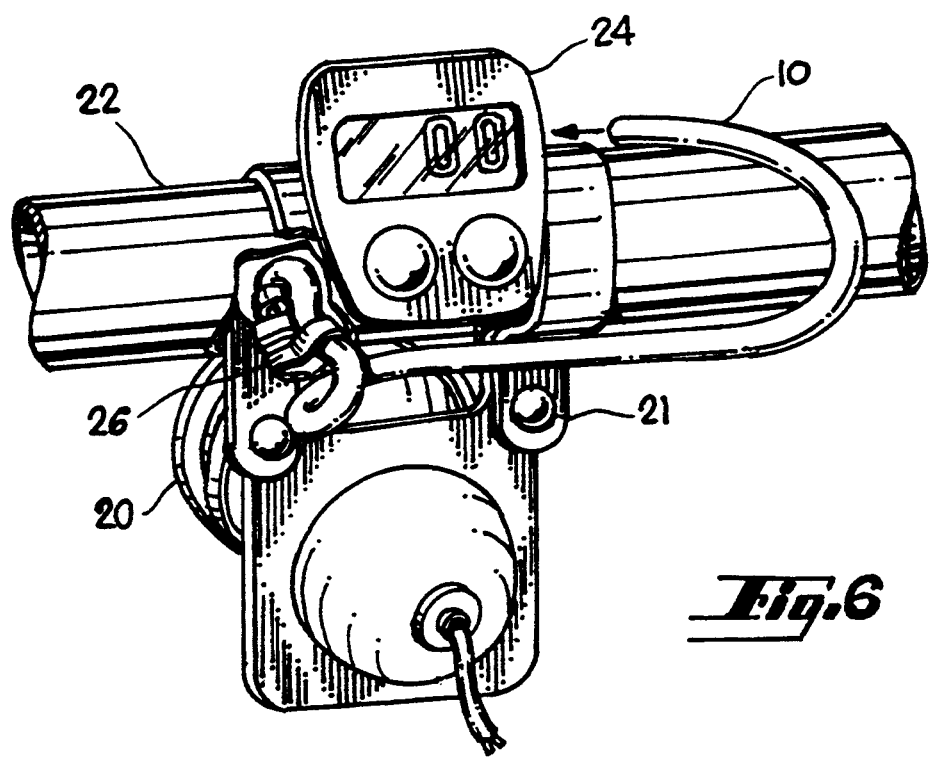
FIG. 6 is a rear perspective view of the light guide illuminating a handlebar mounted speedometer.

Referring now to FIG. 6, light guide 10 is shown positioned to illuminate cyclometer 24. Light guide 10 is then bent into the shape necessary to position its input end to receive illumination from headlight 20. During the mounting process fibers 12, shape-retention member 10 14 and jacket 16 are free to move relative to one another as light guide 10 is bent. The input end of light guide 10 is then cut to length with the input ends of fibers 12 being coplanar. A transparent end cap may be installed on the input end to prevent contamination, if desired. Tie-wrap may be used to limit vibration of the light guide. The light guide can thus accommodate a wide range of separation distances between the light source and the object to be illuminated and is able to assume a variety of convoluted shapes necessary to correctly position its input and output ends. The light guide is able to be manually deformed and positioned to accommodate a variety of relative positions and intervening environments between light source and object.

Figure 7:
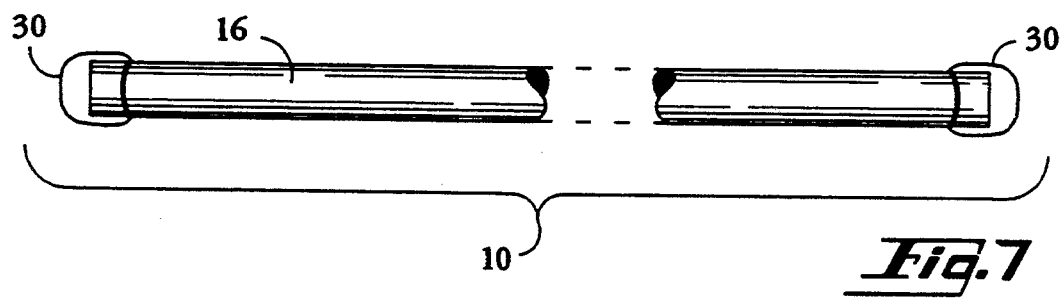
FIG. 7 is an elevational view of another preferred embodiment of the light guide featuring removable end caps.

FIG. 7 illustrates a second preferred embodiment in which each end of light guide 10 is sealed with a removable optically transparent end cap 30. In the preferred embodiment, end cap 30 is constructed of clear plastic material and frictionally engages the outer surface of jacket 16. End caps 30 function to mechanically retain optical fibers 12 and shape-retention member 14 in light guide 10, and seal out moisture or other contaminants from the guide interior. Being removable, end cap 30 may be repositioned on the new guide end following removal of any excess length and/or new shape change.

Figure 8A:
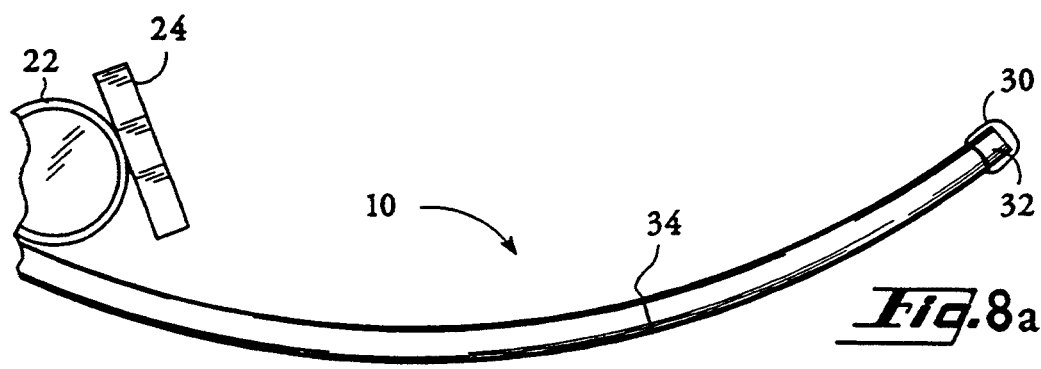
FIGS. 8a–c are partial side perspective views of the light guide being cut to fit the application illustrated in FIGS. 5 and 6.
Figure 8B:
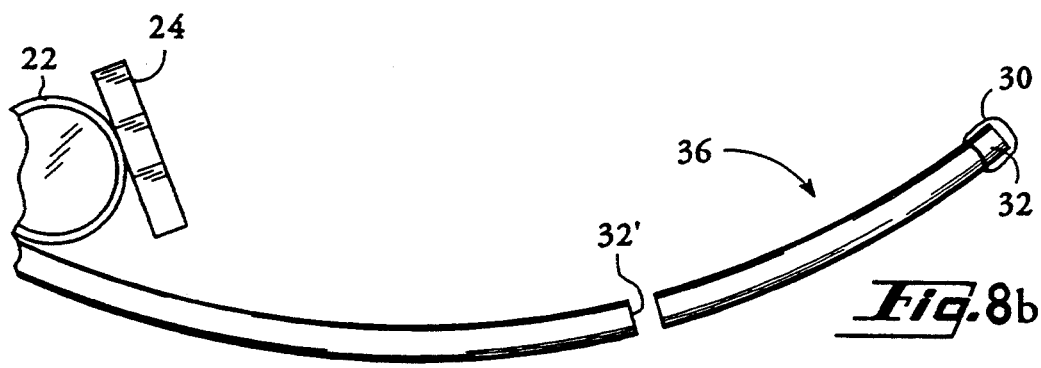
Figure 8C:
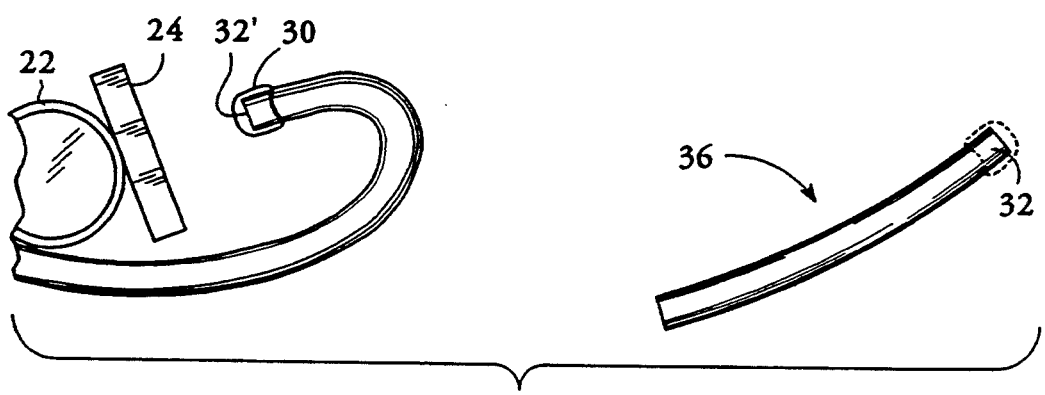

Referring now to FIGS. 8a–c, light guide 10 is shown being cut-to-fit for the application illustrated in FIGS. 5 and 6. In FIG. 8a, an excess length of light guide 10 extends past handlebar 22 after the input end of light guide 10 is positioned to receive illumination from headlight 20, as shown in FIG. 5. Light guide 10 is then cut at a position 34 adjacent to cyclometer 24. This creates a new light guide end 32' and an excess light guide length 36, as illustrated in FIG. 8b. In FIG. 8c, end cap 30 has been removed from excess length 36 and used to reseal new light guide end 32', which is positioned to direct illumination at cyclometer 24. Either end of light guide 10 may be cut-to-fit in this fashion. This embodiment is adaptable to a variety of configurations and can be custom fit in a fast convenient fashion.

I claim:

1. A formable cut-to-fit optical fiber light guide with serpentine shape retentivity comprising:
   a plurality of separate flexible optical fibers having opposed ends, said optical fibers being disposed adjacent to one another in coextensive arrangement and slidable with respect to each other;
   a deformable, elongated, shape-retention member having opposed ends, said shape-retention member being disposed between said optical fibers in coextensive arrangement and slidable with respect to said fibers, said shape-retention member having a fixed state in the absence of manual force, and a pliable state in response to manual force; and
   a flexible jacket surrounding said optical fibers and said shape-retention member for mechanically bundling said optical fibers and said shape-retention member into a cable form, said jacket being slidable with respect to said fibers and said shape-retention member,
   whereby said light guide can be manually formed to extend from a light source to a remote object along a serpentine path and retain said serpentine shape.

2. The light guide of claim 1 wherein said shape-retention member comprises a plastic rod.

3. The light guide of claim 1 wherein said shape-retention member comprises a wire of ductile metal.

4. The light guide of claim 1 wherein said fibers, said shape-retention member and said jacket are adhesively secured to one another at a first cable end at which said fibers terminate.

5. The light guide of claim 1 further comprising an annular sleeve located at a first end at which said fibers terminate, whereby said sleeve secures said fibers into a cylindrical bundle for communication of optical energy.

6. The light guide of claim 5 wherein said sleeve comprises a ferrule.

7. The light guide of claim 1 wherein said jacket comprises a tube of heat-shrinkable material.

8. The light guide of claim 1 wherein said shape-retention member is centrally located near a longitudinal axis of said bundle.

9. The light guide of claim 1 further comprising:
   a removable, translucent end cap disposed at a first end of said cable at which said fibers terminate, said end cap frictionally engaging an outer surface of said jacket,
   whereby said light guide can be truncated adjacent to said light source or said remote object and recapped at a newly truncated cable end with the end cap removed from said first cable end.

10. The light guide of claim 9 further comprising:
    a removable translucent second end cap disposed at a second end of said cable at which said fibers terminate, said second end cap frictionally engaging an outer surface of said jacket.

11. A flexible shape-retaining optical fiber light guide comprising:
    a plurality of flexible optical fibers, slidable with respect to one another, having opposed ends, each of said optical fibers being of equal length and disposed adjacent to one another in coextensive arrangement, said fibers further having a first end at which said fibers are truncated;
    at least one elongated, reformable, shape-retention member having opposed ends, said shape-retention member further having a length equal to the length of said optical fibers, said shape-retention member being disposed adjacent to said optical fibers in coextensive arrangement and slidable with respect to said optical fibers;
    a flexible jacket surrounding said optical fibers and said shape-retention member for mechanically bundling said optical fibers and said shape-retention member into a cable form having opposed ends, said jacket being slidable with respect to said fibers and said shape-retention member; and
    an annular sleeve located at the first end of said fibers for securing said optical fibers into a cylindrical bundle for communication of optical energy.

12. The light guide of claim 11 wherein said optical fibers, said shape-retention member and said jacket are adhesively secured only at the end of said cable where said sleeve is located.

13. The light guide of claim 11 wherein said shape-retention member comprises a wire of ductile metal having a sufficient diameter such that said light guide retains a serpentine shape when flexed.

14. The light guide of claim 11 wherein said jacket comprises a tube of heat-shrinkable material.

15. The light guide of claim 11 wherein said sleeve comprises a ferrule.

16. The light guide of claim 11 wherein said shape-retention member is centrally located at the axis of said bundle of optical fibers.

17. The light guide of claim 11 wherein said shape-retention member is located radially between the axis of said bundle and said sleeve.

18. The light guide of claim 11 wherein said sleeve is located between said shape-retention member and said jacket.

19. The light guide of claim 11 wherein said shape-retention member is located between said sleeve and said jacket.

20. A method for illuminating an object comprising:
providing a deformable, shape-retaining light guide having opposed ends and a removable, translucent end cap;
reforming said light guide such that said light guide extends along a serpentine path with one of said ends near a light source and another of said ends near a remote object;
truncating said light guide near one of said ends including removing an excess length of said light guide; and
attaching said end cap on said light guide at said truncated end.

* * * * *